No. 863,887.　　　　　　　　　　　　　　PATENTED AUG. 20, 1907.
H. STUTTLE.
JOINT CLAMP.
APPLICATION FILED MAR. 17, 1906.

Witnesses:
Geo. E. Gaylord,
John Enders.

Inventor:
Henry Stuttle
By L. B. Coupland.
Atty.

UNITED STATES PATENT OFFICE.

HENRY STUTTLE, OF BATAVIA, ILLINOIS.

JOINT-CLAMP.

No. 863,887.  Specification of Letters Patent.  Patented Aug. 20, 1907.

Application filed March 17, 1906. Serial No. 306,582.

*To all whom it may concern:*

Be it known that I, HENRY STUTTLE, a citizen of the United States, residing at Batavia, in the county of Kane and State of Illinois, have invented new and useful Improvements in Joint-Clamps, of which the following is a specification.

This invention relates to improvements in a joint clamp for the meeting ends of pipe-sections; and has for its object to provide a simple, convenient and efficient device that may be easily and quickly connected in its clamping position and removed with the same facility.

Figure 1:
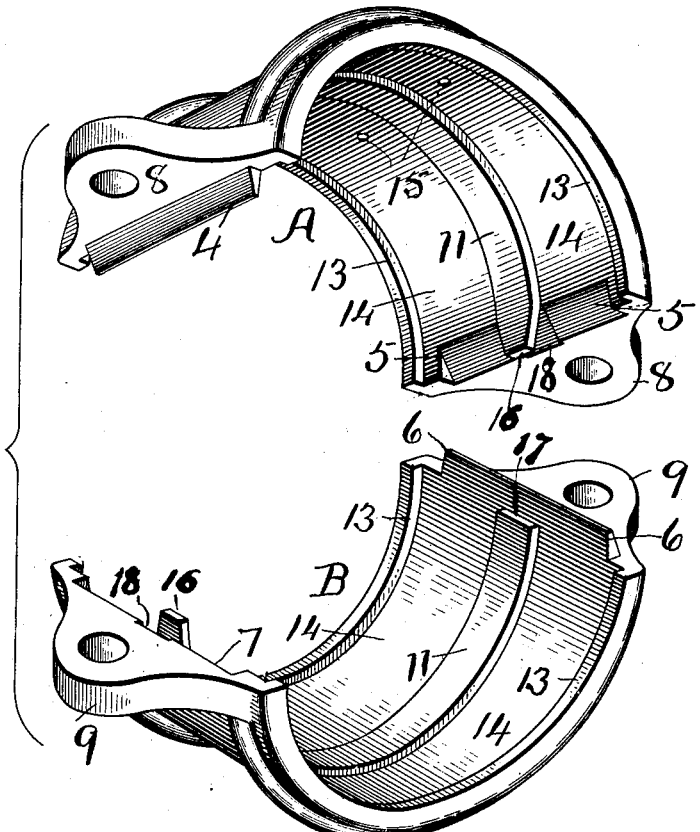
Figure 2:
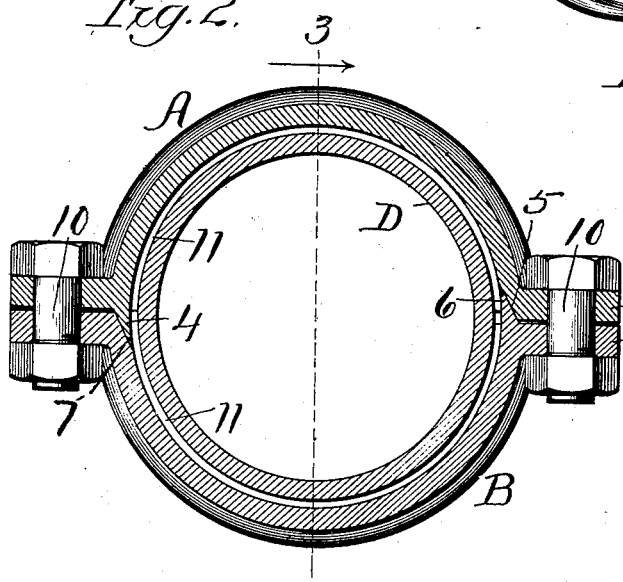
Figure 3:
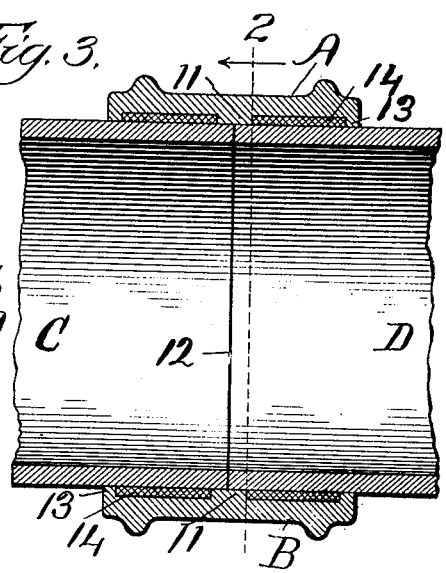

In the drawing, Figure 1 is a view in perspective of the two clamp members. Fig. 2 is a transverse section of line 2, Fig. 3, looking in the direction indicated by the arrow; and Fig. 3 is a longitudinal section on line 3, Fig. 2.

The clamp consists of the semicircular companion members A and B. These clamp-members are a duplicate of each other and when joined together in their clamping position form a tight joint for the meeting or abutting ends of pipe sections. The half clamp member A is provided on one end with a lip 4 and on the opposite end with a corresponding recess 5, each recess being provided with walls 16 at its ends which prevent lateral movement of the lip of the other member received between them and hence guard against displacement of the said members. The member B is provided on the opposite joining end, with reference to the member A, with a lip 6, and the other end with a recess 7. When the two clamp members are joined together, this arrangement brings the lip on one member into engagement with the corresponding recess in the companion member, the bearing surfaces of the lips and recesses being beveled. The lips are approximately triangular in cross section and engage the oppositely disposed recesses with an overlapping wedging-together action in forming a tight joint around a cylindrical object, as shown in Fig. 2. The member A is provided with perforated lugs 8, and the member B with corresponding lugs 9 through which the clamping bolts 10 are inserted in firmly locking the members in place.

Each of the clamp members are provided centrally with the half-part of an annular raised flat rib 11 which is adapted to encircle and cover the open joint 12 of the meeting ends of the pipe-sections C and D. This rib has a close bearing on the pipe and assists in forming a tight joint, and when molten metal is used it prevents the same from flowing into the connecting pipe-sections through the space between the abutting ends.

Each flat rib 11 has at one end a slightly tapering extension 16, the other end 17 of said rib being even with the base of the lip 4 or 6 of the other member of said clamp. When the two clamp members are put together, the end of the extension 16 of the rib 11 of each member fits against the end 17 of the rib 11 of the other member and the inner faces of these ribs are flushed at the meeting point of said ends. These extensions 16 beside thus practically completing a continuous internal circular rib of the clamp, fit close against the inner faces of the lips 4 and 6 and hold them in proper position. A supplementary recess 18, about equal in width to the rib 11, is formed in each clamp section in the outer face of recess 5 opposite the rib extension 16 of said section. These supplemental recesses will allow a slight outward yielding of parts 4 and 6 and 16 adapting the clamp to changes of temperature and making it fit the pipes more perfectly. The position of said supplemental recesses is just outside of the lips 4 and 6, the middle parts of which may expand or be forced slightly into them, locking the two clamp sections even more securely together.

Each of the clamp members have a raised rim edge 13 and thus provides an annular inclosed channel 14 between said rim edges and the rib 11 on each side. These channels are to be filled with the particular kind of packing to be used. The packing may be of a rubber composition, cement or other substance suitable for the purpose in accordance with the requirements of steam, water or gas-pipes. If molten metal is used it can be poured into and the channels filled through apertures 15 in the member A.

By means of this arrangement it will be readily understood with what ease and facility a tight joint may be made or a leak repaired.

Having thus described my invention, what I claim is:—

1. A hose coupling consisting of two semi-circular members and means for fastening them together, each of the said members being provided with a curved rib which fits over a joint of the pipe sections and has a projecting extension at one end, the said sections being also provided with projecting terminal lips and corresponding recesses, substantially as set forth.

2. A hose-clamp consisting of two semi-circular members and means for fastening them together, each of the said members being provided at one end with a projecting lip and at the other end with a corresponding recess and each of the said members being further provided with an internal rib having a projecting extension at one end adapted to fit behind the said lip of the other member substantially as set forth.

3. A hose-clamp consisting of two semi-circular members and means for fastening them together, each of the said members being provided at one end with a projecting lip and at the other with a corresponding recess and each of the said members being provided with an internal rib having one end extended flush with the outer edge of the recess in said member and the other end of said rib terminating at the base of the lip on said member, in order that when the clamp members are fitted together the said lips may fit in the corresponding recesses and the said ribs may fit end to end against each other, making a continuous circular rib, while their extensions 16 fit behind the lips and aid in holding them properly in the recesses substantially as set forth.

4. A hose clamp consisting of two semi-circular members and means for fastening them together each of the said members being provided with a projecting lip and at the other end with a corresponding recess having a supplemental recess in its outer face, and each of the said members being further provided with an internal rib having a projecting extension at one end adapted to fit behind the said lip of the other member opposite such supplemental recesses substantially as set forth.

In testimony whereof I affix my signature, in presence of two subscribing witnesses.

HENRY STUTTLE.

Witnesses:
L. B. COUPLAND,
G. E. CHURCH.